United States Patent
Wang et al.

(10) Patent No.: US 8,431,673 B2
(45) Date of Patent: Apr. 30, 2013

(54) RADIATION CURABLE COMPOSITIONS

(75) Inventors: Zhikai Jeffrey Wang, Roswell, GA (US); Christopher Wayne Miller, Lititz, PA (US); Marcus Lee Hutchins, Hiram, GA (US); James C. Matayabas, Jr., Canton, GA (US)

(73) Assignee: Cytec Surface Specialties S.A., Brussels (BE)

( * ) Notice: Subject to any disclaimer, the term of this patent is extended or adjusted under 35 U.S.C. 154(b) by 0 days.

(21) Appl. No.: 12/743,657

(22) PCT Filed: Nov. 7, 2008

(86) PCT No.: PCT/EP2008/065148
§ 371 (c)(1),
(2), (4) Date: Jul. 6, 2010

(87) PCT Pub. No.: WO2009/065743
PCT Pub. Date: May 28, 2009

(65) Prior Publication Data
US 2011/0028641 A1    Feb. 3, 2011

Related U.S. Application Data

(60) Provisional application No. 60/996,475, filed on Nov. 19, 2007.

(51) Int. Cl.
*C08G 18/00*    (2006.01)
(52) U.S. Cl.
USPC ............. 528/76; 528/70; 528/71; 528/72; 528/73; 528/74; 528/75; 528/45; 522/90; 522/97; 522/92; 522/94; 522/96; 522/98; 522/174
(58) Field of Classification Search ........... 522/90, 522/97, 92, 94, 96, 98, 174; 528/70, 71, 528/72–76, 45; 524/187, 195, 198, 196, 524/199, 210, 590, 759, 871, 873, 875
See application file for complete search history.

(56) References Cited

U.S. PATENT DOCUMENTS

| 3,294,713 A | 12/1966 | Hudson et al. | |
|---|---|---|---|
| 4,192,762 A * | 3/1980 | Osborn | 252/182.18 |
| 4,225,695 A | 9/1980 | Schuster et al. | |
| 4,334,034 A | 6/1982 | Lehner et al. | |
| 4,680,369 A | 7/1987 | Kajimoto et al. | |
| 4,727,128 A | 2/1988 | Pedain et al. | |
| 5,569,725 A | 10/1996 | Carroll et al. | |
| 5,990,192 A | 11/1999 | Gerlitz et al. | |
| 7,981,987 B2 * | 7/2011 | Stockel et al. | 526/301 |
| 2004/0254258 A1 * | 12/2004 | Horikoshi et al. | 523/102 |

FOREIGN PATENT DOCUMENTS

| EP | 0329389 A2 | 8/1989 |
|---|---|---|
| EP | 0739968 A1 | 10/1996 |
| EP | 1512704 A1 | 3/2005 |
| GB | 1490428 | 11/1977 |

OTHER PUBLICATIONS

Thomas Francis et al; "Carbamates and 2-oxazolidinones from Tertiary Alcohols and Isocyanates;" Canadian Journal of Chemistry, National Research Council. Ottawa, CA; Jan. 1, 1976, pp. 24-30, vol. 54, XP009111686, table 2.
Chattopadhyay et al.; "Structural engineering of polyurethane coatings for high performance applications;" Progress in Polymer Science, Pergamon Press, Oxford, GB, vol. 32, No. 3; Mar. 2, 2007; pp. 352-418; XP005911233.
Jerry March, "Organic Chemistry; Reactions, Mechanisms, and Structure," Third Edition; Appendix I; II and IV; p. 791; p. 802 and p. 688, respectively, 1985.
Roberts et al., "Basic Principles of Organic Chemistry," Sec. 19-13 Isocyanates, p. 685 (Appendix III), 1964.
International Search Report of PCT/EP2008/065148; mailed Feb. 26, 2009.

* cited by examiner

*Primary Examiner* — Michael L Leonard
(74) *Attorney, Agent, or Firm* — Wenderoth, Lind & Ponack, L.L.P.

(57) ABSTRACT

The present invention relates to composition comprising at least one compound obtained from the reaction of at least one compound (i) having a refractive index $n_D^{20}$ of at least 1.50 comprising at least one isocyanate-reactable functional group —XH, wherein each of X is, independently, O or NR, at least one polyisocyanate (ii), and, optionally, at least one compound (iii) comprising at least one isocyanate-reactable functional group —YH and at least one curable functional group Q, wherein each of Y is, independently, O, NR or S, and its use for making high refractive index coatings and films.

15 Claims, No Drawings

RADIATION CURABLE COMPOSITIONS

This application is the U.S. National Phase application of International Application No. PCT/EP2008/065148, filed Nov. 7, 2008 and published as WO 2009/065743, which claims benefit of priority from U.S. Provisional patent application No. 60/996,475, filed Nov. 19, 2007, each of which is incorporated by reference herein in its entirety.

This invention relates to new radiation curable compositions, especially to new radiation curable compositions which have a high refractive index.

For many optical applications it is desirable for coatings or films to exhibit high refractive index. For example high refractive index coatings are applied to flat panel displays, such as liquid crystal displays (LCD's), as brightness enhancing film. Polarizer films used in LCD's also require hard coatings of high refractive index. It is also desirable that such coatings provide improved protection to the substrate, for example improved resistance e.g. to scratching.

Radiation curable compositions having a high refractive index have been known for several years.

Usually these compositions comprise different radiation curable monomers and/or oligomers, some of which based on thiols. A presentation made during Radtech 2007 by I. Khudyakov et al. described thiourethanes with high refractive index obtained from the reaction of thiols such as thiophenol or polysulfides with diisocyanates and 2-hydroxyethylacrylate. Polysulfide thiourethane acrylates have also been described by Quan et al., Journal of Applied Polymer Science, Vol. 91, 2358-2363 (2004). Thiols and polysulfides in general have a bad odor and hence may present problems during their use and also during subsequent use of the products obtained from these thiols and polysulfides. Moreover, thiourethanes have in general also a poor stability.

We now have found a new class of radiation curable compositions which enable to provide high refractive index films and coatings which do not present the drawbacks of the radiation curable compositions described before.

The present invention therefore relates to a composition comprising at least one compound obtained from the reaction of at least one compound (i) having a refractive index $n_D^{20}$ of at least 1.50 comprising at least one isocyanate-reactable functional group —XH, wherein each of X is, independently, O or NR, at least one polyisocyanate (ii), and, optionally, at least one compound (iii) comprising at least one isocyanate-reactable functional group —YH and at least one curable functional group Q, wherein each of Y is, independently, O, NR or S.

The refractive index $n_D^{20}$ of a material is generally defined as being the ratio of the speed of electromagnetic radiation in free space to the speed of the radiation in that material, the radiation being sodium yellow light at a wavelength of about 589.3 nm and the measurement being done at 20° C.

The invention further relates to a composition comprising at least one compound of formula (I)

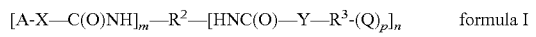  formula I wherein:
$0 \leq n < 6$
$0 < m \leq 6$
$2 \leq n+m \leq 6$
$1 \leq p \leq 6$
$R^2$ is the residue of a polyisocyanate (ii) comprising (n+m) isocyanate groups
$R^3$ is a chosen from alkylene, arylene and aralkylene chains which may optionally contain from 1 to 4 ether, tertiary amine, —CO— and/or —O—CO— bridges;

A is the residue of a compound (i) of formula A-X—H
X is O or NR
each of Y is, independently, selected from O, NR and S
each of R is, independently, H, alkyl or aryl group
each of Q is, independently, a curable group comprising at least one of carbon-carbon double bond, a thiol or epoxy group.

The invention further relates to a composition comprising at least one compound of formula (II)

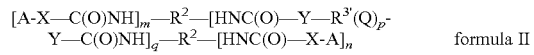  formula II wherein:
$1 \leq n \leq 3$
$1 \leq m \leq 3$
$1 \leq q \leq 3$
$1 \leq p \leq 6$
$R^2$ is the residue of a polyisocyanate (ii) comprising (n+m) isocyanate groups
$R^{3'}$ is the residue of a compound of comprising two —YH groups and p Q groups;
A is the residue of a compound (i) of formula A-X—H
X is O or NR
each of Y is, independently, selected from O, NR and S
each of R is, independently, H, alkyl or aryl group
each of Q is, independently, a curable group comprising at least one of carbon-carbon double bond, a thiol or epoxy group.

The term "alkyl", as used herein, is defined as including saturated, monovalent hydrocarbon radicals having straight, branched or cyclic moieties or combinations thereof and containing 1 to 50 carbon atoms, preferably 1 to 20 carbon atoms. The term "aryl" as used herein, is defined as including an organic radical derived from an aromatic hydrocarbon comprising 1 or more rings by removal of one hydrogen, and containing from 5 to 30 carbon atoms, such as phenyl and naphthyl. The term "alkylene" as used herein, is defined as including saturated, divalent hydrocarbon radicals having straight, branched or cyclic moieties or combinations thereof and containing 1 to 50 carbon atoms.

The term "alkenylene" as used herein, is defined as including unsaturated, divalent hydrocarbon radicals having straight, branched or cyclic moieties or combinations thereof, containing at least one carbon-carbon double bond and containing 1 to 50 carbon atoms, preferably 1 to 20 carbon atoms.

The term "arylene" as used herein, is defined as including divalent radicals derived from an aromatic hydrocarbon comprising one or more rings by removal of two hydrogen atoms and containing from 5 to 30 carbon atoms.

The term "aralkylene" as used herein, represents a divalent radical comprising a combination of alkylene and arylene moieties. Aralkylene groups having from 6 to 30 carbon atoms are preferred.

By alkyl, alkylene, arylene and aralkylene containing an ether bridge is meant an alkyl, alkylene, arylene or aralkylene radical wherein a carbon atom is replaced by an oxygen atom, forming a group such as —C—O—C—.

By alkyl, alkylene, arylene and aralkylene chain containing, respectively, a tertiary amine bridge, a —CO— bridge or a —CO—O— bridge is meant such radical wherein, respectively, a tertiary amine group, a

group or a

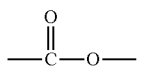

group, is present between 2 carbon atoms, forming, respectively, a group of formula —C—NR—C—,

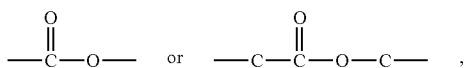

wherein R represents an alkyl or aryl group. In that case, R is preferably an alkyl group containing from 1 to 15 carbon atoms. Compounds of formula (I) wherein n≦m, in particular wherein n<m, are preferred. In the present invention, compound (i) of formula A-X—H is generally a compound comprising a moiety A which comprises at least one S atom and/or at least one aryl and/or arylene group, and optionally containing at least one halogen, preferably bromine, atom.

Preferably compound (i) is a compound of formula $R^4$—Y—$R^5$—X—H wherein each of $R^4$ and $R^5$, independently, is chosen from alkylene, arylene and aralkylene chains, optionally substituted by one or more halogen, preferably bromine, atom. More preferably at least one of $R^4$ and $R^5$ is an arylene or aralkylene chain, most preferably at least one of $R^4$ and $R^5$ is a phenylene group.

More preferably compound (i) is a compound of formula $R^4$—S—$R^5$—X—H wherein each of $R^4$ and $R^5$, independently, is chosen from alkylene, arylene and aralkylene chains, optionally substituted by one or more halogen, preferably bromine, atom. More preferably at least one of $R^4$ and $R^5$ is an arylene or aralkylene chain, most preferably at least one of $R^4$ and $R^5$ is a phenylene group.

Preferably compound (i) has a refractive index $n_D^{20}$ of at least 1.55, more preferably at least 1.58, most preferably at least 1.59.

Preferably compound (i) is an alcohol of formula A-O—H, especially an alcohol of formula $R^4$—S—$R^5$—O—H, wherein $R^4$ and $R^5$ are defined such as here above.

Examples of suitable compounds (i) are 2-phenoxyethanol, 3-(methylthio)-1-propanol, 4-(methylthio) benzyl alcohol and 2-phenylthioethanol. Particularly preferred is 2-phenylthioethanol.

According to a particular embodiment of the present invention, mixtures of two or more different compounds (i) are used. In this case at least one of compounds (i) used is a compound having refractive index $n_D^{20}$ of at least 1.55, more preferably at least 1.58, most preferably at least 1.59.

In this case, at least one of compounds (i) used is an alcohol of formula $R^4$—S—$R^5$—O—H, wherein $R^4$ and $R^5$ are defined such as here above. For example mixtures of 2-phenoxyethanol and 2-phenylthioethanol can be used. This particular embodiment is particularly suitable when polyisocyanates comprising more than 2 isocyanate groups are used.

In the present invention, the polyisocyanate (ii) is generally an aromatic, aliphatic, araliphatic or cycloaliphatic polyisocyanate or derivatives thereof containing urethane, isocyanurate, allophanate, biuret, uretdione and/or imino-oxadiazinedione groups.

Preferred are polyisocyanates of formula $R^2$—$(NCO)_{n+m}$ wherein n+m is at least 2 and preferably not more than 6 and $R^2$ is chosen from alkylene, arylene and aralkylene chains which may contain one or more —N—CO—O— and/or

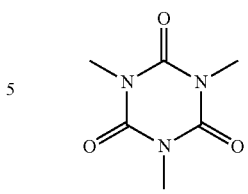

bridges.

In the present invention n+m is preferably 2 to 4, more preferably 2 to 3 and most preferably 2.

More preferably the polyisocyanate (ii) is a di- or tri-isocyanate, most preferably a di-isocyanate, or a di- or tri-mer thereof.

Preferably the polyisocyanate (ii) contains at least one arylene group, more preferably at least one phenylene group.

Preferably the polyisocyanate (ii) is an asymmetric polyisocyanate.

Preferred polyisocyanates (ii) are those having a refractive index $n_D^{20}$ of at least 1.46, more preferably at least 1.51, most preferably at least 1.59.

Examples of suitable polyisocyanates are diphenylmethane-2,4'-diisocyanate, diphenylmethane-4,4'-diisocyanate, 2,4-toluene-diisocyanate, 2,6-toluene-diisocyanate, 1,6-diisocyanatohexane, dicyclohexylmethane-2,4'-diisocyanate, dicyclohexylmethane-4,4'-diisocyanate, 5-isocyanato-1-isocyanatomethyl-1,3,3-trimethylcyclohexane (isophorone diisocyanate, IPDI), meta-tetramethylxylylene diisocyanate, 1,3-bis-(isocyanatomethyl)benzene, 1,5-naphthylene diisocyanate, their di-, tri- or oligomers and their adducts with polyols,

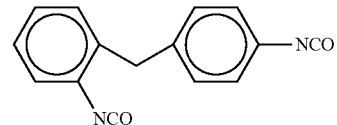

Diphenylmethane 2,4″–Diisocyanate
CAS #26447-40-5

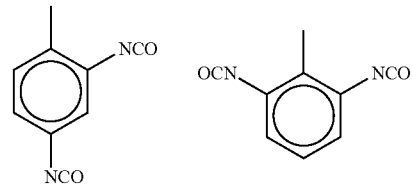

Toluene Diisocyanate (TDI)

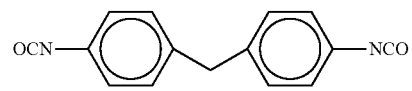

Diphenylmethane 4,4″–Diisocyanate

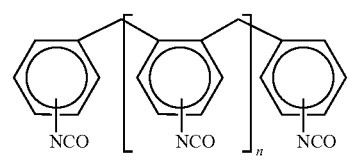

MDI Oligomer, CAS # 9016-87-9

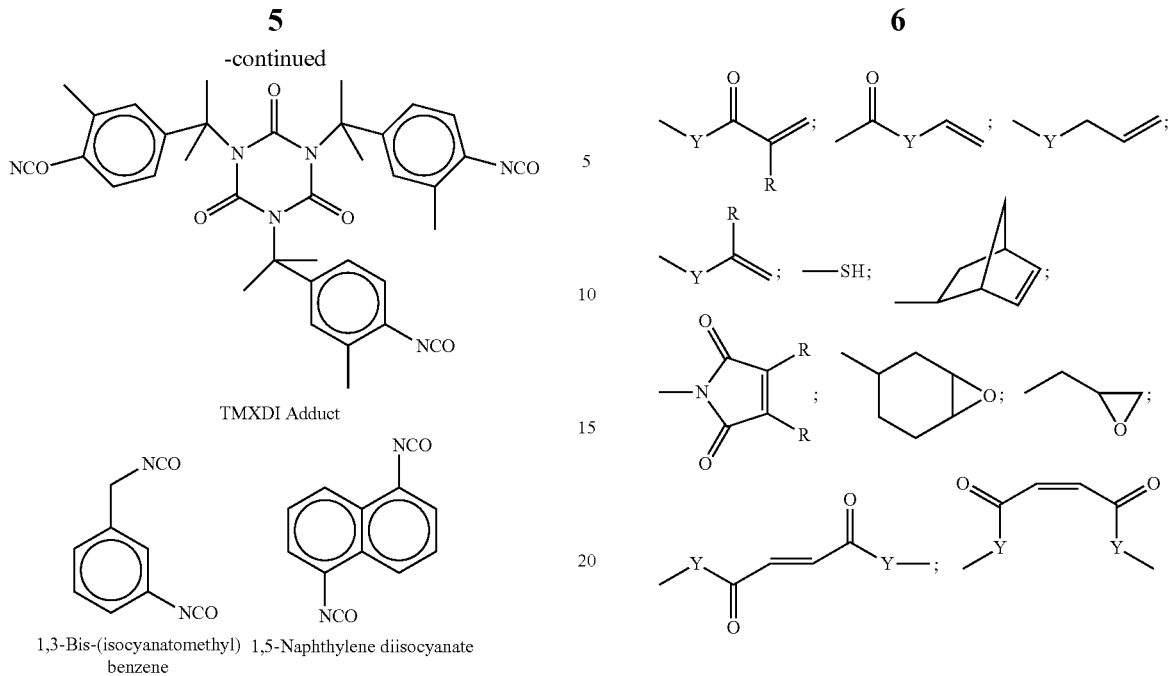

Particularly preferred are diphenylmethane-2,4'-diisocyanate and diphenylmethane-4,4'-diisocyanate, more particularly diphenylmethane-2,4'-diisocyanate, and the oligomers thereof such as the MDI oligomer described here above wherein n is from 0 to 4, more preferably from >0 to 4.

According to a preferred embodiment of the invention a composition comprising at least one compound obtained from the reaction of at least one compound (i) having a refractive index $n_D^{20}$ of at least 1.50 comprising at least one isocyanate-reactable functional group —XH, wherein each of X is, independently, O or NR, at least one polyisocyanate (ii), and at least one compound (iii) comprising at least one isocyanate-reactable functional group —YH and at least one curable functional group Q, wherein each of Y is, independently, O, NR or S is used.

By curable functional group Q is meant to understand in the present invention, a functional group which under curing conditions, permits the polymerization of the compound of formula I, optionally together with other curable compounds present in the composition. The chemical reactions employed to effect cure during the polymerization process may include reactions proceeding through free-radical, cationic, anionic, Michael-type addition, Diels-Alder-type addition, oxidative, and other chemical processes. For example, compounds according to this invention containing vinyl reactive functionalities might be polymerized by a free-radical initiated copolymerization process, a free-radical initiated Michael-addition thiol-ene process, a photo-initiated [2+2] cycloaddition process, a thermally initiated [4+2] cycloaddition process, etc. Thiol functional compounds might be polymerized through a photoinitiated or thermally initiated thiol-ene free-radical.

Curing is more preferably done by exposure to electromagnetic radiation in the UV, visible, or infrared regions of the spectrum, electron beam irradiation, or optionally by heat.

Curable functional groups are generally selected from carbon-carbon double bond, thiol and epoxy groups. Suitable curable groups are preferably selected from wherein Y and R are as defined here above.

The carbon-carbon double bond containing curable functional groups include (meth)acrylate, (meth)acrylamide, (meth)acrylthioester, N-vinylamide, vinylester, vinylthioester, allylether, allyamine, allylsulfide, N-vinylamine, vinylether, vinylsulfide, maleate, fumarate, maleamide, fumaramide, thiomaleate, thiofumarate, maleimide, citraconimide and norbornene groups.

Preferred are curable groups Q selected from (meth)acrylates and allylethers. In the present invention, the term "(meth)acryl" is to be understood as to encompass both acryl and methacryl compounds or derivatives as well as mixtures thereof. Preferably curable groups Q are selected from —O—CO—CH=CH$_2$, —O—CO—CCH$_3$=CH$_2$, —O—CH$_2$—CH=CH$_2$, —O—CH=CH$_2$, —O—CCH$_3$=CH$_2$, more preferably from —O—CO—CH=CH$_2$ and —O—CO—CCH$_3$=CH$_2$. Q is most preferably —O—CO—CH=CH$_2$.

In the present invention, preferred compounds (iii) are those having a refractive index $n_D^{20}$ of at least 1.44, more preferably at least 1.50, most preferably at least 1.55.

In the present invention, compound (iii) comprising at least one isocyanate-reactable functional group —YH and at least one curable functional group Q, generally is a compound of formula HY—R$^3$-(Q)$_p$ or a compound of formula (HY)$_2$R$^{3'}$(Q)$_p$, wherein Y, R$^3$, R$^{3'}$, Q and p are as defined here above.

Examples of suitable compounds (iii) of formula HY—R$^3$-(Q)$_p$ are (meth)acrylates and (meth)acrylamides, such as 2-hydroxyethyl acrylate, 2-hydroxyethyl methacrylate, 4-hydroxybutyl acrylate, hydroxypropyl acrylate (2 isomers), hydroxypropyl methacrylate, pentaerythritol triacrylate, di-tri methylolpropane triacrylate, tricyclodecane-dimethanol monoacrylate, N-methylethanolamine acrylate, N-(hydroxymethyl)acrylamide; N-vinylamides such as 5-(hydroxymethyl)-1-vinyl-2-pyrrolidinone, 3-hydroxy-N-vinyl proprionamide (2-cyano-N-vinylacetamide hydrolyzed to carboxylic acid, then reduced to alcohol); allyls such as diallylamine, allyl alcohol, N-allyl-N-methylamine, N-allyl-N-cyclopentylamine, N-allyl-N-phenyl amine, N-allyl-2,2'-iminodiethanol; vinylethers such as 4-hydroxybutyl vinylether, ethylenegylcol monovinylether, 3,4-dihydro-2H-pyran-2-methanol, diethyleneglycol monovinylether; norbornenes such as 5-norbornene-2-methanol, 5-norbornene-2, 3-dimethanol monoacrylate; epoxides such as 2-oxiranylmethanol, (2S,3S)-trans-3-phenyloxirane-2-methanol, trimethylolpropane diglycidylether, pentaerythritol triglycidylether, Bisphenol-A monoglycidylether, Bisphenol-F monoglycidylether, Bisphenol-A (3-chloro-2-hydroxypropyl) glycidylether.

Compound (iii) of formula $HY—R^3-(Q)_p$ preferably comprises not more than 4 curable functional groups Q, more preferably not more than 3 and most preferably only 1 curable group Q. In formula I, p is preferably $\leq 4$, more preferably $\leq 3$, most preferably p is 1.

The isocyanate-reactable functional group —YH of compound (iii) is preferably —OH. Preferred compounds (iii) include the esterification products of aliphatic and aromatic polyols with (meth)acrylic acid having a residual average hydroxyl functionality of about 1. The partial esterification products of (meth)acrylic acid with tri-, tetra-, penta- or hexahydric polyols or mixtures thereof are suitable. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. These modified or unmodified polyols are partly esterified with acrylic acid, methacrylic acid or mixtures thereof until the desired residual hydroxyl functionality is reached. Examples of such compounds are those comprising at least two (meth)acryl functions such as glycerol diacrylate, trimethylolpropane diacrylate, glycerol diacrylate, pentaerythritol triacrylate, ditrimethylolpropane triacrylate, dipentaerythritol pentaacrylate and their (poly)ethoxylated and/or (poly)propoxylated equivalents.

Preferred compounds (iii) are the (meth)acrylic esters with linear and branched polyols in which at least one hydroxy functionality remains free, like hydroxyalkyl(meth)acrylates having 1 to 20 carbon, preferably 1 to 6, atoms in the alkyl group. Preferred molecules in this category are hydroxyethyl (meth)acrylate, hydroxypropyl (meth)acrylate, hydroxybutyl (meth)acrylate. Acrylates are preferred. Most preferred are hydroxypropyl acrylates, in particular 2-hydroxypropyl acrylate. According to another embodiment of the invention, compounds (iii) comprising more than one isocyanate reactive groups —YH are used. Among these compounds, compounds (iii) comprising more than one isocyanate reactive groups —YH and more than one radiation curable groups Q are preferred. Preferred are compounds of formula $(HY)_2R^{3'}(Q)_p$, more specifically (meth)acryloyl dihydroxy compounds and poly(meth)acryloyl dihydroxy compounds. Acrylates are particularly preferred.

In this embodiment, particularly preferred compounds (iii) are those obtained from the reaction of polyglycidyl, more specifically diglycidyl, compounds with (meth)acrylic acid. Aromatic glycidyl compounds derived from polyphenolic resins, bisphenol A and bisphenol F are preferred. Particularly preferred are bisphenol A diglycidyl ether, bisphenol F diglycidyl ether and their ethoxylated and/or propoxylated equivalents. It is also possible to employ diglycidyl esters, such as diglycidyl phthalate, N,N-diglycidyl aniline, N,N-diglycidyl-4-glycidyloxyaniline. Especially preferred is the diacrylate ester of bisphenol A diglycidylether.

In the compound of formula I, p is preferably $\leq 4$, more preferably $\leq 3$, most preferably p is 1. In the compound of formula I, n is preferably 1. In the compound of formula I, m is preferably 1 or 2, more preferably 1. In the compound of formula I, $R^3$ is preferably an alkylene comprising from 1 to 20, more preferably 1 to 6, carbon atoms.

In the compound of formula II, p is preferably $\leq 4$, more preferably $\leq 3$, most preferably p is $\geq 1$; n is preferably 1; m is preferably 1 or 2, more preferably 1; q is preferably 1. In the compound of formula II, $R^{3'}$ is preferably as defined for R3 here above, more preferably an aralkylene comprising from 7 to 30, more preferably 19 to 21, carbon atoms.

In the specific embodiment where a compound (iv) is used, part of the A-X—C(O)NH— groups are replaced by A'-X—C(O)NH— groups in compounds of formula (I) and (II).

The composition according to the invention can be prepared by any method suitable therefore. In general, the composition is prepared by reacting from 0.5 to 1.2 equivalents compound (i) per equivalent of polyisocyanate (ii) and, optionally from 0 to 0.6 equivalents of compound (iii).

The composition according to the invention is preferably prepared by reacting from 0.55 to 1.1 equivalents compound (i) and from 0.1 to 0.6 equivalents of compound (iii), per equivalent of polyisocyanate (ii). The composition according to the invention is more preferably prepared by reacting from 0.55 to 0.9 equivalents compound (i) and from 0.2 to 0.55 equivalents of compound (iii), per equivalent of polyisocyanate (ii). The composition is most preferably prepared by reacting from 0.6 to 0.8 equivalents compound (i) and from 0.3 to 0.4 equivalents of compound (iii), per equivalent of polyisocyanate (ii).

It is particularly preferred to use an equivalent ratio of compound (i) to compound (iii) of higher than 1, more preferably from 1.1 to 19, more preferably from 1.2 to 2.0, and most preferably from 1.2 to 1.6.

By equivalent is meant to designate in the present invention the number of equivalents of isocyanate reactive groups —XH provided by compound (i), respectively —YH provided by compound (iii), per equivalent of isocyanate groups provided by the polyisocyanate (ii).

The present invention also relates to a process for the preparation of a composition as described here above wherein from 0.5 to 1.0 equivalents of compound (i) per equivalent of polyisocyanate (ii) and, optionally from 0 to 0.5 equivalents of compound (iii) are reacted with a polyisocyanate compound (ii).

In the process according to the invention, the reaction is preferably conducted in at least 2 steps, wherein in a first step, at least part of the polyisocyanate (ii) is reacted first with the compound (iii), and in a second step the reaction product obtained is further reacted with compound (i).

The reaction is generally performed in the present of a catalyst, such as for example amine and orgametallic complex catalysts. Dibutyl tin dilaurate catalyst is particularly suitable.

The reaction is preferably performed at a temperature of from 20 to 120° C., more preferably from 50 to 100° C.

The reaction is preferably performed in the presence of a polymerization inhibitor or stabilizer or any combination thereof. Primary anti-oxidants (free-radical inhibitors) such as quinones, in particular hydroquinone, and di-tert butyl p-cresol are particularly preferred.

The reaction can be performed in the presence of a solvent or diluent, preferably a reactive solvent or diluent. By reactive solvent or diluent is meant to designate a compound which is curable as described here above, but which does not react with compound (i), (ii) and optionally (iii). According to a preferred embodiment, at least reactive diluent is added to the composition, during, at the end of and/or after its synthesis.

The composition according to the invention generally contains at least 5%, preferably at least 15%, more preferably at least 25%, by weight of compound of formula I. The amount of compound I usually does not exceed 95% by weight, preferably 80% by weight of the composition.

The composition according to the invention preferably contains, besides the one or more compounds of formula I, at least curable reactive diluent. This diluent is preferably a copolymerizable ethylenically unsaturated compound, more preferably a mono- or polyfunctional (meth)acrylate compound. By copolymerizable ethylenically unsaturated compound is meant to designate monomers and oligomers that are copolymerisable with the compound of formula I, generally under photo-polymerisation conditions, especially by irradiation. Preferred copolymerizable ethylenically unsaturated compounds are mono- and multifunctional (meth)acrylates that have a refractive index $n_D^{20}$ of at least 1.45, more preferably at least 1.50, most preferably at least 1.55.

Preferred copolymerizable ethylenically unsaturated compounds are those having a viscosity of at most 200 cP.s at 25° C.

Examples of suitable monomers and oligomers include (meth)acrylic acid, beta-carboxyethyl acrylate, butyl (meth) acrylate, methyl (meth)acrylate, isobutyl (meth)acrylate, 2-ethylhexyl(meth)acrylate, cyclohexyl (meth)acrylate, trimethyl cyclohexyl (meth)acrylate, n-hexyl (meth)acrylate, isobornyl (meth)acrylate, isooctyl (meth)acrylate, n-lauryl (meth)acrylate, octyl/decyl (meth)acrylate, 2-hydroxyethyl (meth)acrylate, phenoxyethyl(meth)acrylate, nonylphenolethoxylate mono(meth)acrylate, 2-(-2-ethoxyethoxy)ethyl (meth)acrylate, 2-butoxyethyl (meth)acrylate, benzyl (meth) acrylate, bromobenzyl (meth)acrylate, dibromobenzyl (meth)acrylate, tribromobenzyl (meth)acrylate, pentabromobenzyl (meth)acrylate, cardura (meth)acrylate, 1,6-hexanediol di(meth)acrylate, pentaerythritoltri(meth)acrylate, trimethylolpropanetri(meth)acrylate, phenylglycidylether (meth)acrylate, bisphenol diglycidylether(meth)acrylate and (meth)acrylated oxyethylated or/and oxypropylated derivatives thereof, urethane (meth)acrylates, epoxy (meth)acrylates and polyester (meth)acrylates.

Preferred (meth)acrylated compounds are those comprising at least one group selected from aromatic, cyclohexyl, halogen such as chlorine, bromine or iodine, and sulfur-containing groups.

Among these preferred (meth)acrylated compounds, particularly preferred are halogenated, especially brominated, (meth)acylated compounds and arylthioether (meth)acrylates.

Examples of brominated (meth)acylated compounds include brominated aromatic (meth)acrylates, especially unsubstituted and alkyl-substituted bromophenyl (meth) acrylates, bromo-benzyl (meth)acrylates, bromophenoxy ethyl (meth)acrylates, (meth)acrylated brominated bisphenol-A and bisphenol-F derivatives, such as tetrabromobisphenol-A-diacrylate, and ethoxylated and/or propoxylated brominated bisphenol-A-diacrylates.

Especially preferred are 2-(2,4,6-tribromophenoxy)-ethyl acrylate and 2,4,6-tribromophenyl acrylate.

Preferred arylthioether (meth)acrylates are unsubstituted and substituted phenylthioether (meth)acrylates. Particularly preferred is 2-phenylthioethyl(meth)acrylate.

Preferred (meth)acrylated compounds comprising at least one aromatic group are phenyl (meth)acrylates, especially 2-phenoxyethyl acrylate, and (meth)acrylated bisphenol-A and bisphenol-F derivatives, especially their oxyethylated and/or oxypropylated derivatives. Especially preferred are bisphenol-A oxyethylated diacrylates, such as those commercialized under the name of EBECRYL®0150, and 2-phenoxyethyl acrylate, commercialized under the name of EBECRYL®0114.

The amount of reactive diluent present in the composition is generally from 0 to 60%, preferably from 0 to 50%, more preferably from 0 to 30%, by weight.

The composition used in the process according to the invention usually also contains at least one inhibitor. Inhibitors include without limitation hydroquinone, toluhydroquinone, monomethyl ether hydroquinone, tert-butyl hydroquinone, di-tert-butyl hydroquinone, phenothiazine. The amount of inhibitor used is preferably from 0 to 0.5% by weight.

The composition may also comprise at least one photochemical initiator and/or chemical initiator, capable of initiating the polymerization of the curable compound and optionally the other curable compounds present therein. Photochemical initiators (also called photoinitiators) are compounds that can generate radicals by absorption of light, typically UV light. The photoinitiators are preferably free-radical photoinitiators.

When cured under UV-light, curable compositions comprising at least one photoinitiator are preferred. The amount of photoinitiator or chemical initiator in the composition is preferably comprised between 0.01 and 5 wt %.

Alternatively, the composition can be cured in the absence of an initiator, especially by electron beam radiation.

The curable composition according to the invention may also comprise other additives such as dispersing agents, surfactants, wetting agents, emulsifying agents, antioxidants, flow modification agents, slip agents, fire retardant agents, UV-protection agents. The total amount of additives preferably does not exceed 10% by weight.

The compositions according to the invention are preferably substantially free of water and organic solvents which are considered as being volatile organic solvents (VOC's). Hence, the compositions are generally considered as 100% curable composition, which do not need evaporation of water or solvent during subsequent curing.

The radiation curable composition according to the invention generally presents a high refractive index. In general, the radiation curable composition according to the invention presents a refractive index $n_D^{20}$ of at least 1.55, preferably at least 1.56, more preferably at least 1.60.

The curable compositions according to the invention generally have a viscosity, measured at 25° C. according to ASTM method D-2196-05, of at most 300,000 cP.s, preferably of at most 30,000 cP.s, more preferably of at most 5,000 cPs, and most preferably of at most about 200 cP.s.

The radiation curable composition according to the invention permits to obtain films and coatings presenting a high refractive index as well as good mechanical properties. The compositions according to the invention permit to obtain films and coatings which present high tensile strength elongation, modulus and toughness. The compositions according to the invention permit to obtain films and coatings which present high scratch resistance.

The compositions according to the invention permit to obtain clear films and coatings which have good transparency.

The radiation curable compositions according to the invention are therefore suitable to prepare films and coatings used in flat panel displays such as LCD's and as brightness enhancing films.

The present invention therefore further relates to a method for making films and coatings, especially for use in flat panel displays and brightness enhancing films, wherein a composition according to the invention is used, as well as the coatings and films obtained with a composition according to the invention. The composition according to the invention can be charged to a mold that may bear a microstructure to be replicated or applied to the surface of a substrate and then polymerized by exposure to radiation or to heat in order to produce a cured coating or film. Radiation is generally done by UV-light or by electron bean.

The coatings and films prepared using a composition according to the invention generally present a high refractive index. In general, the coatings and films present a refractive index of at least 1.54, preferably at least 1.56, more preferably at least 1.58. The refractive index of the cured coatings or film was determined at 20° C. using ruby red laser at 632.8 nm (Metrocon Prism Coupler, Model #2010).

The following examples are submitted for a better understanding of the invention without being restricted thereto.

EXAMPLE 1

500 g of diphenylmethane-diisocyanate MDI commercialized as Mondur®ML (mixture of diphenylmethane-2,4'-diisocyanate and diphenylmethane-4,4'-diisocyanate) and 1.6 g of dibutyltin dilaurate catalyst were placed into a reactor and agitated at room temperature. A mixture of 0.12 g of HQ (hydroquinone inhibitor) and 0.6 g of butylated hydroxytoluene in 208 g of hydroxypropylacrylate was added thereto over about 1 hour while maintaining the temperature to 65-71° C. and holding the reaction at that temperature for 30 minutes. Then 369.9 g of 2-(phenylthio)ethanol was added thereto over 1 to 2 hours while maintaining the temperature to 88-93° C. The reaction mixture was held at this temperature until the NCO content was ≦0.2%. 0.12 g of HQ was added to the reaction mixture as well as 270 g of 2-phenoxyethyl acrylate EBECRYL®114.

A light yellow, clear liquid having a density of 1.15 g/cm$^3$, $n_D^{20}$ of 1.5804 and a viscosity of 25,400 cPs (at 25° C.) was obtained.

EXAMPLE 2

Example 1 was repeated except that 260 g of hydroxypropylacrylate and 308 g of 2-(phenylthio)ethanol was used and that 268 g of 2-phenoxyethyl acrylate EBECRYL®114 were added.

A hazy semi-solid having a density of 1.13 g/cm$^3$ and $n_D^{20}$ of 1.5740 was obtained.

EXAMPLE 3

Example 1 was repeated except that no 2-phenoxyethyl acrylate EBECRYL®114 was added.

A light yellow, clear liquid having a density of 1.19 g/cm$^3$, $n_D^{20}$ of 1.6057 and a viscosity of 12,500 cPs (at 60° C.) was obtained.

This product was further diluted with, respectively, 10, 20, 30, 40 and 50% by wt of 2-phenoxy acrylate EBECRYL®114. The properties obtained are presented in table 1.

TABLE 1

| Product of Ex. 3 wt % | 90 | 80 | 70 | 60 | 50 |
|---|---|---|---|---|---|
| EBECRYL ® 114 wt % | 10 | 20 | 30 | 40 | 50 |
| Viscosity at 25° C. | 223000 | 27100 | 4840 | 1180 | 393 |
| $n_D^{20}$ | 1.5966 | 1.5884 | 1.5792 | 1.5715 | 1.5617 |

EXAMPLE 4

369.60 g of polymeric diphenylmethane-diisocyanate (Mondur®MR Light) and 1.17 g of dibutyltin dilaurate catalyst were placed into a reactor and agitated at room temperature. A mixture of 0.16 g of HQ (hydroquinone inhibitor) and 0.78 g of butylated hydroxytoluene in 130 g of hydroxypropylacrylate was added thereto over about 1 hour while maintaining the temperature to 65-71° C. and holding the reaction at that temperature for 30 minutes. Then 277.2 g of 2-(phenylthio)ethanol was added thereto over 1 to 2 hours while maintaining the temperature to 88-93° C. The reaction mixture was held at this temperature until the NCO content was ≦0.2%. 0.16 g of HQ was added to the reaction mixture.

A dark brown solid having a density of 1.1 g/cm$^3$, $n_D^{20}$ of 1.6187 and a viscosity of 120,000 cPs (at 60° C.) was obtained.

EXAMPLE 5

A composition comprising 60 g of the product obtained in Example 1, 13 g of bisphenol-A ethoxylate diacrylate EBECRYL®150, 10 g of aromatic urethane hexaacrylate EBECRYL®220, 17 g of 2-phenoxyethyl acrylate EBECRYL®114 and 0.5 of photoinitiator IRGACURE®819 was prepared by mixing until a homogeneous, free of air bubble composition was obtained. Coatings on polyester film were prepared by pouring a 20-25 g of composition along the top border of the film, covering it with another piece of film and spreading the mixture evenly between the sheets of PET films with a wireless stainless steel drawdown bar. The sandwiched mixture was then cured by exposing to UV light (600 W/inch Fusion H bulb—energy density 500 mJ/cm2). A coating thickness of about 0.5 mils was obtained. The top sheet of PET films was peeled away and the refractive index of the cured film was determined at 20° C. using ruby red laser at 632.8 nm. The refractive index of the cured film was 1.5832 (the $n_D^{20}$ of the composition was 1.5603 and its viscosity at 25° C. was 2100). The coating had a pencil hardness of 3H, tensile of 4008 psi, elongation of 7.1%, a modulus of 182609 psi and a toughness of 267 psi.

EXAMPLE 6

A composition comprising 46 g of the product obtained in Example 3, 23 g of bisphenol-A ethoxylate diacrylate EBECRYL®150, 4.3 g of pentaerithrytol tri-tetraacrylate PETIA, 26 g of 2-phenoxyethyl acrylate EBECRYL®114, 0.1 g of silicone diacrylate EBECRYL®350 and 0.1 g of the additive ADDITOL®VXW 6214 and 0.5 of photoinitiator IRGACURE®819 was prepared by mixing until a homogeneous, free of air bubble composition was obtained. Coatings on polyester film were prepared as described in Example 5.

The properties obtained are described in Table 2.

TABLE 2

| | |
|---|---|
| Tensile, psi | 2753 |
| Elongation, % | 18.2 |
| Modules, psi | 146566 |
| Toughness, psi | 407 |
| Pencil hardness | H |
| Viscosity at 25 deg C, cPs | 1850 |
| Viscosity at 50 deg C, cPs | 250 |
| Transmission, % | 92 |
| RI liquid | 1.5622 |
| RI Cured | 1.5828 |
| Shrinkage, % | 3 |
| T(g), deg C | n/a |
| Cure Response, mJ/cm$^2$ | 500 |
| Adhesion to substrate (5B = 100% adhesion) | 5B |

EXAMPLE 7

A composition comprising 66 g of the product obtained in Example 3, 6.5 g of pentaerithrytol tri-tetraacrylate PETA-K and 27.5 g of 2-phenoxyethyl acrylate EBECRYL®114 was prepared. This composition presented a $n_D^{20}$ of 1.575 and a viscosity at 25° C. of 4,400. Coatings with a pencil hardness of 2H were obtained.

EXAMPLE 8

A mixture comprising 162 g of 2-phenoxyethyl acrylate commercialized as EBECRYL®114, 162 g of -phenylphenoxyethylacrylate, 1.29 g of butylated hydroxytoluene (BHT), 0.26 g of HQ and 484.55 g of bisphenol-A-epoxy diacrylate commercialized as EBECRYL®3700 was prepared. This mixture was added to a mixture of 500 g of diphenylmethane-2,4'-diisocyanate (MDI, Mondur®ML) and 1.94 g of dibutyltin dilaurate catalyst placed into a reactor and agitated at room temperature. The temperature was maintained at 93° C. After 2 hours, 308 g of 2-(phenylthio)ethanol was added thereto over 1 hour while maintaining the temperature at about 93° C. The reaction mixture was held at this temperature until the NCO content was ≦0.2%. 0.29 g of HQ and 0.65 g of BHT were added to the reaction mixture.

A low color (<1 Gardner) liquid having a $n_D^{20}$ of 1.6034 and a viscosity of 175,500 cPs (at 60° C.) was obtained. Mn/Mw was 1.425/3.526.

EXAMPLE 9

A mixture comprising 285.1 g of o-phenylphenoxyethylacrylate, 1.14 g of BHT, 0.23 g of HQ and 484.55 g of bisphenol-A-epoxy diacrylate commercialized as EBECRYL®3700 was prepared. This mixture was added to a mixture of 348 g of toluene diisocyanate and 1.71 g of dibutyltin dilaurate catalyst placed into a reactor and agitated at room temperature. The temperature was maintained at 93° C. After 2 hours, 308 g of 2-(phenylthio)ethanol was added thereto over 1 hour period while maintaining the temperature at about 93° C. The reaction mixture was held at this temperature until the NCO content was ≦0.2%. 0.29 g of HQ and 0.57 g of BHT were added to the reaction mixture.

A low color (<1 Gardner) liquid having a $n_D^{20}$ of 1.6006 and a viscosity of 146,000 cPs (at 60° C.) was obtained. Mn/Mw was 1,203/2,014.

The invention claimed is:

1. A composition comprising at least one compound (A) obtained from the reaction of at least one compound (i) having a refractive index $n_D^{20}$ of at least 1.50, optionally, 2-phenoxyethanol, at least one polyisocyanate (ii), and, optionally, at least one compound (iii) comprising at least one isocyanate-reactable functional group —YH and at least one curable functional group Q, wherein each of Y is, independently, O, NR or S, wherein compound (i) is selected from the group consisting of 3-(methylthio)-1-propanol, 4-(methylthio) benzyl alcohol and 2-phenylthioethanol;

wherein the curable functional group Q is a carbon-carbon double bond containing curable functional group; and wherein compound (A) is obtained by reacting from 0.5 to 1.2 equivalents of compound (i) and, optionally, 2-phenoxyethanol, per equivalent of polyisocyanate (ii) and, optionally, from 0 to 0.6 equivalents of compound (iii).

2. The composition according to claim 1, wherein compound (i) is 2-phenylthioethanol.

3. The composition according to claim 1, comprising a mixture of 2 or more different compounds (i), and optionally 2-phenoxyethanol.

4. The composition according to claim 1, wherein the at least one compound (A) is obtained from the reaction of 2-phenylthioethanol, 2-phenoxyethanol, at least one polyisocyanate (ii), and, optionally, at least one compound (iii).

5. The composition according to claim 1, wherein the polyisocyanate (ii) is an aromatic, aliphatic, araliphatic or cycloaliphatic polyisocyanate, or a derivative thereof containing urethane, isocyanurate, allophanate, biuret, uretdione and/or imino-oxadiazinedione groups.

6. The composition according to claim 5, wherein the polyisocyanate (ii) is a di-isocyanate, or a di- or tri-mer thereof.

7. The composition according to claim 1, wherein the curable functional group Q is selected from the group consisting of (meth)acrylates and allylethers.

8. The composition according to claim 1, wherein the compound (iii) is a hydroxyalkyl(meth)acrylate having 1 to 20 carbon atoms in the alkyl group.

9. The composition according to claim 1, wherein compound (iii) is a compound obtained from reacting diglycidyl compounds with (meth)acrylic acid.

10. The composition according to claim 1, wherein the curable functional group Q is selected from the group consisting of —O—CO—CH=CH$_2$, —O—CO—CH$_3$=CH$_2$, —O—CH$_2$—CH=CH$_2$, —O—CH=CH$_2$ and —O—CCH$_3$=CH$_2$.

11. The composition according to claim 10, wherein the curable functional group Q is selected from the group consisting of —O—CO—CH=CH$_2$ and —O—CO—CCH$_3$=CH$_2$.

12. A process for making the composition according to claim 1, comprising reacting from 0.5 to 1.2 equivalents of compound (i) and, optionally, 2-phenoxyethanol, per equivalent of polyisocyanate (ii) and, optionally from 0 to 0.6 equivalents of compound (iii), with a polyisocyanate compound (ii).

13. The process according to claim 12, wherein the equivalent ratio of compound (i) to compound (iii) is higher than 1.

14. A method for making a film and/or coating, comprising applying the composition according to claim 1 to a substrate.

15. A coating and/or film obtained from the composition according to claim 1.

* * * * *